US008890802B2

(12) United States Patent
Case, Jr. et al.

(10) Patent No.: US 8,890,802 B2
(45) Date of Patent: Nov. 18, 2014

(54) DEVICE WITH DISPLAY POSITION INPUT

(75) Inventors: Charlie W. Case, Jr., Lake Oswego, OR (US); James Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1036 days.

(21) Appl. No.: 12/157,441

(22) Filed: Jun. 10, 2008

(65) Prior Publication Data

US 2009/0303208 A1    Dec. 10, 2009

(51) Int. Cl.
*G09G 5/00* (2006.01)
*G06F 1/16* (2006.01)
*G06F 3/14* (2006.01)

(52) U.S. Cl.
CPC ...... *G06F 1/1616* (2013.01); *G09G 2340/0492* (2013.01); *G06F 1/1684* (2013.01); *G06F 2200/1637* (2013.01); *G06F 1/1647* (2013.01); *G06F 1/1677* (2013.01); *G06F 3/1423* (2013.01)
USPC ............ 345/156; 345/158; 345/168; 345/169

(58) Field of Classification Search
CPC ..... G06F 1/1616; G06F 1/1618; G06F 1/162; G06F 1/1667; G06F 1/1677; G06F 1/1641; G06F 1/1647; G06F 1/1622; G06F 2200/1614; G06F 3/048; G06F 3/04815; G06F 3/0346; G06F 1/1647; G06F 3/00; G06F 3/0353; G06F 3/011; G06F 2200/1637; G06F 1/1626; G06F 1/1694; G06F 3/0354

USPC ........... 345/156–158, 168–169, 1.1, 1.2, 1.3, 345/2.1, 2.2, 2.3, 3.1, 4, 5, 6; 700/17, 40, 700/66
See application file for complete search history.

(56) References Cited

U.S. PATENT DOCUMENTS

| | | | | |
|---|---|---|---|---|
| 4,639,081 A | * | 1/1987 | O'Brien | 359/478 |
| 5,274,363 A | * | 12/1993 | Koved et al. | 345/2.1 |
| 5,742,331 A | * | 4/1998 | Uomori et al. | 348/51 |
| 6,020,890 A | * | 2/2000 | Kohda | 345/419 |
| 6,512,497 B1 | * | 1/2003 | Kondo et al. | 345/1.1 |
| 6,788,292 B1 | * | 9/2004 | Nako et al. | 345/173 |
| 7,061,472 B1 | * | 6/2006 | Schweizer et al. | 345/168 |
| 7,126,588 B2 | * | 10/2006 | Oakley | 345/169 |
| 7,184,025 B2 | * | 2/2007 | Williams et al. | 345/169 |
| 7,327,330 B2 | * | 2/2008 | Kawai et al. | 345/6 |
| 7,411,579 B2 | * | 8/2008 | Tsuji et al. | 345/158 |

(Continued)

FOREIGN PATENT DOCUMENTS

| | | |
|---|---|---|
| CN | 1968368 A | 5/2007 |
| JP | 9-311625 A | 12/1997 |

(Continued)

OTHER PUBLICATIONS

Office Action Received for Chinese Patent Application No. 200910149660.5 mailed on Jun. 9, 2011, 6 pages of Office Action and 10 pages of English Translation.

(Continued)

*Primary Examiner* — Jason Mandeville
(74) *Attorney, Agent, or Firm* — Patent Capital Group (57) ABSTRACT

In accordance with some embodiments, an electronic device is provided with one or more position sensors, providing it with the ability to detect, and use as part of its user interface, a special orientation of a part of the device.

20 Claims, 5 Drawing Sheets

(56) References Cited

U.S. PATENT DOCUMENTS

| | | | |
|---|---|---|---|
| 7,433,179 B2 * | 10/2008 | Hisano et al. | 361/679.27 |
| 7,636,071 B2 * | 12/2009 | O'Gorman | 345/1.1 |
| 8,149,214 B2 * | 4/2012 | Cho et al. | 345/158 |
| 2004/0041788 A1 * | 3/2004 | Ternullo | 345/158 |
| 2005/0243783 A1 * | 11/2005 | Lee et al. | 370/338 |
| 2006/0241713 A1 * | 10/2006 | Freeberg | 607/30 |
| 2007/0120762 A1 * | 5/2007 | O'Gorman | 345/1.1 |

FOREIGN PATENT DOCUMENTS

| | | |
|---|---|---|
| JP | 10055165 A * | 2/1998 |
| JP | 2003-302957 A | 10/2003 |
| JP | 2006053629 A | 2/2006 |
| JP | 2007-47294 | 2/2007 |

OTHER PUBLICATIONS

Office Action Received for Chinese Patent Application No. 200910149660.5 mailed on Sep. 15, 2010, 6 pages of Office Action and 11 pages of English Translation.

Office Action Received for Chinese Patent Application No. 200910149660.5 mailed on Dec. 23, 2011, 6 pages of Office Action and 9 pages of English Translation.

Office Action Received for Japanese Patent Application No. 2009-139036 mailed on Feb. 7, 2012, 4 pages of Office Action and 5 pages of English Translation.

Office Action Received for Chinese Patent Application No. 200910149660.5, Mailed on Jul. 4, 2012, 16 pages of office Action including 9 pages of English Translation.

Office Action received for Taiwan Patent Application No. 98118222, mailed on Mar. 13, 2013, 16 Pages of Office Action including 8 pages of English Translation.

Office Action received for Japanese Patent Application No. 2009-139036, mailed on Mar. 5, 2013, 7 pages of Office Action including 4 pages of English Translation.

Office Action received for Taiwanese Patent Application No. 98118222, mailed on Jun. 14, 2013, 3 pages of English Translation only.

Office Action received for Japanese Patent Application No. 2009-139036, mailed on Mar. 4, 2014, 6 pages of Office Action and 8 pages of English translation.

* cited by examiner

DEVICE WITH DISPLAY POSITION INPUT

BACKGROUND

The present invention relates generally to electronic devices and in particular, to an electronic device with display position feedback for controlling one or more aspects of the device.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In accordance with some embodiments, an electronic device is provided with one or more position sensors, providing it with the ability to detect, and use as part of its user interface, a special orientation of one or more parts of the device. As used herein, an electronic device is any device with one or more displays such as a notebook computer or cell phone, as well as tablets, global positioning sensor (GPS) units, and the like. In some embodiments, an electronic device detects the relative rotational position of a display, e.g., relative to another part of the device or to a reference such as a gravity vector in space. The device may use this information as an input for controlling something with the device, e.g., to control what or how content is displayed, for example, the point of view of displayed content.

Figure 1A:
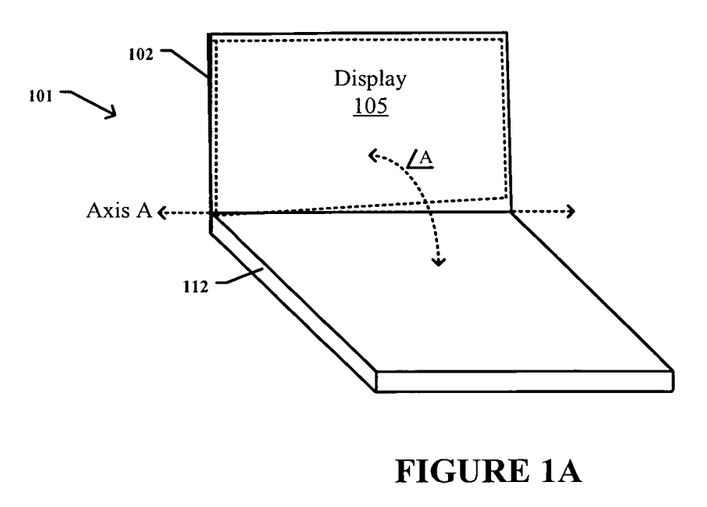
FIG. 1A shows a notebook computing device with a first display in accordance with some embodiments.
Figure 1B:
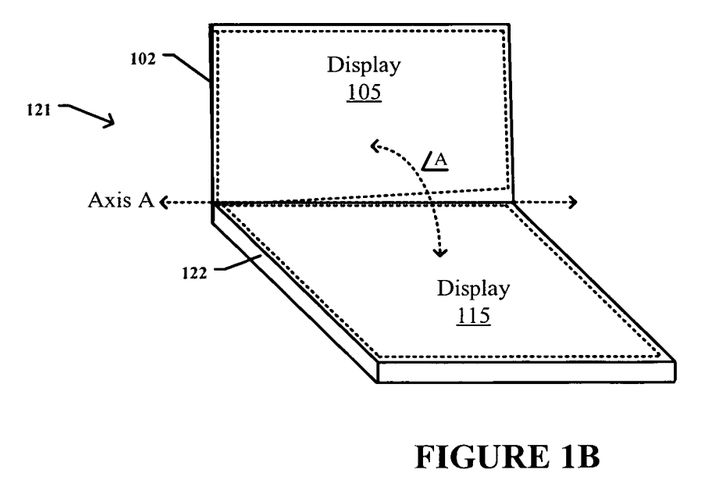
FIG. 1B shows a notebook computing device with first and second displays in accordance with some embodiments.
Figure 1C:
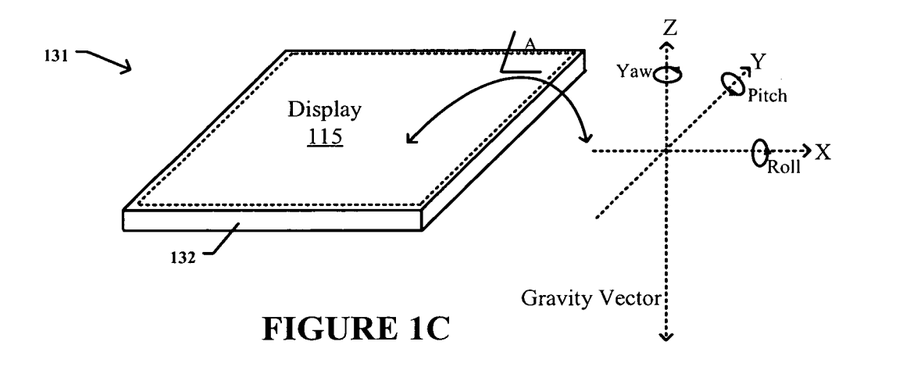
FIG. 1C shows an electronic computing device with a first display in accordance with some embodiments.

FIGS. 1A to 1C show different electronic devices having display position information (feedback) as input for controlling an aspect of the device, such as a view on a display, in accordance with some embodiments. FIG. 1A shows a so-called "notebook" or "laptop" type computer. It has first and second pieces 102, 112 rotatably coupled to one another about an axis "A" in a so-called clam shell configuration. It also has a first display 105 in the first piece 102. FIG. 1B shows a notebook 121 that is similar to notebook 101, except it has a second display 115 in its second piece 122. In this embodiment, either or both of its displays are so-called "touch screens" or have touch screen portions to implement user input functionality such as keypads and the like. FIG. 1C is a device, such as a so-called "tablet" computer, formed from a first piece 132 with a display 115 for viewing information and facilitating user input.

The displays may be implemented with any suitable display type, including but not limited to liquid crystal displays (LCD), surface-conduction electron-emitter displays (SED), field emission display (FED), and organic light emitting diode (OLED) displays, etc. Moreover, they may also have, with one or more of the displays, touch control capabilities, e.g., via suitable resistive or capacitive grid sensing.

The electronic devices also have one or more position sensors to measure relative and/or absolute positions of a display on the device. The relative position sensors measure the position of a display against an external reference and/or against another part or parts of the device, while absolute position sensors can determine the geographical position of the device (e.g., such as with global positioning). In some embodiments, relative position sensors include one or more angular or rotational displacement sensors to measure an angle between a display and another part of the device (e.g., the angle "A" between first and second rotatably coupled pieces in devices 101 and 121). Other sensors (e.g., inertial sensors, accelerometers, gyroscopes, compasses, level sensors, etc.) could be used to measure the relative or absolute position of a display against an external reference such as a gravity vector, as is shown with device 131.

The one or more sensors may be implemented with any suitable sensor type for performing these functions. Sensors for determining absolute position and direction of the device include but are not limited to GPS units used to determine device position on the surface of the earth, and magnetic compasses for detecting magnetic north for direction, accelerometers used to determine direction of local gravity vector (e.g., down direction ), tilt sensors and inclinometers, which generate an artificial horizon and measure angular displacement with respect to this horizon, and altitude sensors to mention just a few. In some embodiments, inertial (gyro, compass, or accelerometer systems), may be implemented, e.g., using a combination of accelerometers and angular rate sensors (gyroscopes) to detect altitude, location, and motion. They may also be capable of detecting attitude, position, velocity, temperature, or magnetic field.

Sensors for determining relative movement of the device include but are not limited to inertial sensors such as accelerometers or gyroscopes, and angle sensors (rotary), e.g., to be disposed near hinge area. Suitable angle sensors may include rotary position sensors including potentiometers, resolvers, optical encoders, and a variety of magnetic and capacitive devices, particularly those designed for angular displacement less than one turn.

Figure 2A:
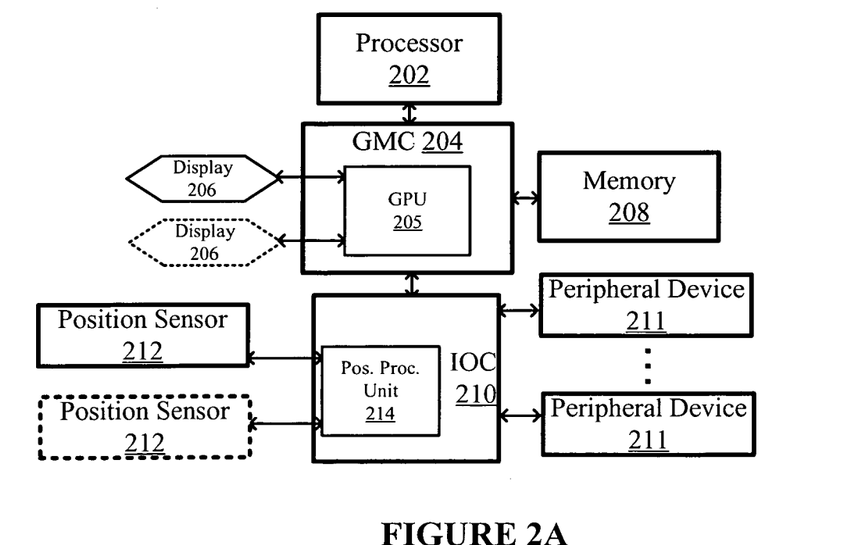
FIG. 2A is a block diagram of a computing system having position feedback in accordance with some embodiments.
Figure 2B:
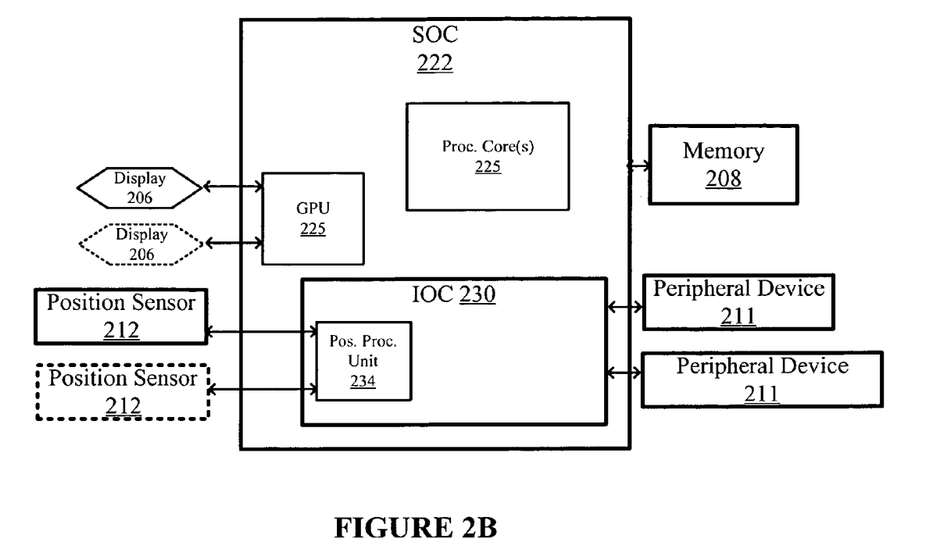
FIG. 2B is a block diagram of a computing system with a system-on-chip implementation having position feedback in accordance with some embodiments.
Figure 3A:
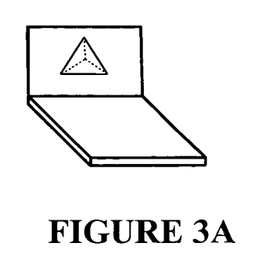
FIGS. 3A-3F illustrate a computing device using display position feedback to control a view in accordance with some embodiments.
Figure 3B:
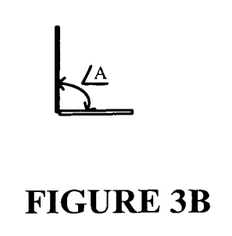
Figure 3C:
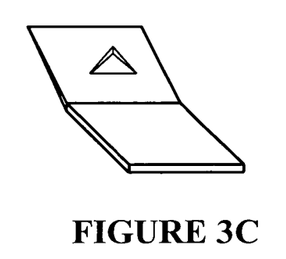
Figure 3D:
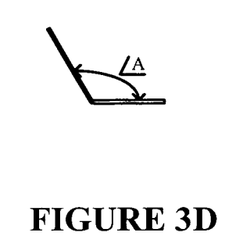
Figure 3E:
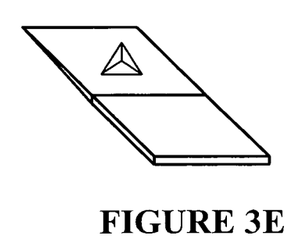
Figure 3F:
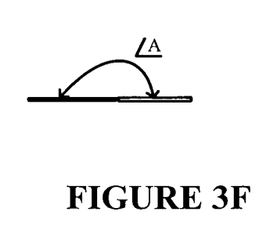
Figure 4A:
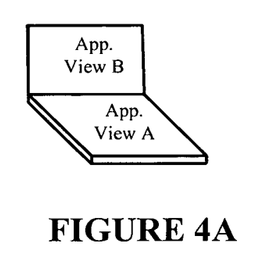
FIGS. 4A-4F illustrate a computing device using display position feedback to control a view in accordance with some additional embodiments.
Figure 4B:
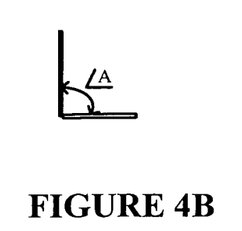
Figure 4C:
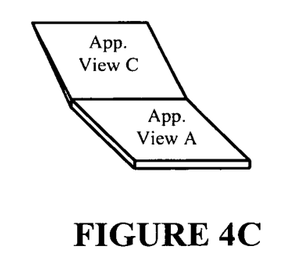
Figure 4D:
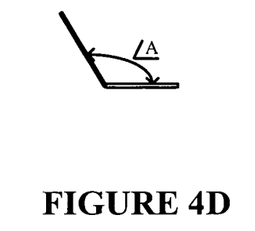
Figure 4E:
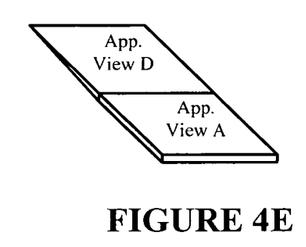
Figure 4F:
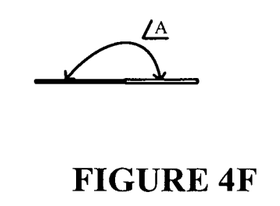

FIGS. 2A and 2B show exemplary computing systems for implementing at least portions of the electronic devices discussed herein. FIG. 2A shows a portion of a computing system comprising a processor 202, graphics/memory controller (GMC) 204, input/output controller (IOC) 210, memory 208, peripheral devices 211, one or more displays 206, and one or more position sensors 212. The processor 202 may be implemented with any suitable processor having one or more processing cores (not shown) to run one or more applications for generating content to be displayed on the one or more displays. It is worth noting that the processor could be implemented in a separate chip and/or package or could be part of a chip or package that is common to other components such as the GMC and/or IOC.

The GMC 204 implements memory and graphics control functionality. It has a memory controller to control access to/from memory 208 and a graphics processing unit (GPU) 205 to generate graphics content for the one or more displays 206 based on application(s) running in the processor 202. The IOC 210 controllably couples the peripheral devices 211 to the rest of the system. The peripheral devices comprise user interface devices (keypad, stylist interface, touch screen interface, audio components, etc.), network interface devices including wireless interface components, access ports such as universal serial bus (USB) ports and the like. The position sensors could comprise any combination of one or more like and or different position sensors as discussed above. The IOC comprises a position processing unit 214 to receive position feedback information for the relative position of at least a part of the one or more displays 206. it processes the information, determines the relative position and provides it to the graphics processing unit 205. In turn, the GPU 205 generates graphic content based on the relative position. For example, it may have content to display, based on the executing application(s), but will display a given view or perspective of the content based on the relative position. it should be appreciated that content and view processing may be performed in the GPU, the processor, or a combination of the GPU and processor.

FIG. 2B shows an implementation of a computing system, such as the one just described for FIG. 2B, but implemented in a system-on-chip (SOC) configuration. It may have equivalent functional units and devices, as shown, but they may or may not be implemented to the same extent. For example, SOC implementations would typically have less flexibility and performance capability than a full computing system implementation. SOC implementations may be particularly suited for more specialized devices (e.g., phones, organizers, etc.) and for less-expensive implementations.

FIGS. 3A to 3F show an exemplary implementation of position based graphical content where the viewpoint for content is affected by the relative position of the display. Here, the computer is a notebook with a clamshell configuration. It has one or more rotational displacement sensors (e.g., magnetic angular displacement sensor) disposed to sense an angle between the two hinged pieces, e.g., the angle of the display relative to the base piece.

In this example, a simple pyramid is shown. When the display is at an angle "A" of 90 degrees, a perspective view from the front side of the pyramid is displayed. As the display moves down, e.g., as the angle increases, the viewpoint is correspondingly changed until the view becomes from the top, looking down onto the pyramid, when the angle is at 180 degrees. In this way, a user is able to conveniently "rotate' her perspective view of an object simply by moving the display in accordance with a desired view. This use model could be used for a variety of applications including but not limited to computer aided drawing (CAD) tools and mapping applications. For example, in a device such as a portable web appliance with multiple sensors, in an application such as with Google Earth™, the device display could be used as a virtual viewport to view where you are on the earth map ( GPS ), which direction you are pointing the screen with respect to magnetic north (compass/accelerometer), and control the Google Earth™ point of view to correspond with a user's (device's) location, heading, and elevation. For example, one could hold the display up and point it at a mountain or building. The sensors could provide the input necessary to control the Google Earth display to show the same mountain on the device display. As the device display is rotated around in space, the display image of Google Earth™ could be changed in real time to match where the user is pointing the device. If the device display is pointed at the ground, the Google Earth™ image displayed could be the default map view.

To add to this example, for devices with multiple displays that can move with respect to one another, each could operate independently, according to it's orientation. For example, if one display surface is parallel to the earth surface, it could show a map view, whereas the other display, if oriented orthogonally to the surface of the earth, could show a view directed at the horizon. The orientation of the map view may have "map north" aligned parallel with magnetic north, as sensed by a compass in the device. Movement of the device about the roll, pitch, and yaw axes as depicted in FIG. 1C could be sensed by a combination of sensors, and could be used to adjust the displayed Google Earth (virtual) view as one would expect looking through a camera at the real view.

FIGS. 4A to 4F show an example of another usage model for display position based display control. In this example, a device with first and second displays is used. For the running application, a view A, is displayed on the second display, while a different view for the application is shown on the first display. The view option used for the first display is dictated by the position of the first display. In this example, when the display angle is within a range around 90 degrees, App. View B is shown, when in a range of about 110 to 160 degrees, App. view C is shown, and when in a range from 160 to 180 degrees, App. View D is shown. Thus, the display angle is used as part of the user interface control to select an option in the running application. An example of an application where this may be used is PowerPoint™ or any other application with multiple view options. For example, slides in a presentation could all be shown simultaneously on the second display, with the first display displaying a different view option, e.g., a slide show, a whole selected slide, etc., based on the position of the first display. In this way, a user could easily control the view option by simply moving, e.g., rotating, the first display.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus, comprising:
a first portion of the apparatus, the first portion including a first display;
a second portion of the apparatus coupled to the first portion of the apparatus by a hinge;
one or more first sensors configured to measure an angle between the first portion of the apparatus and the second portion of the apparatus rotatably coupled to the first portion of the apparatus by the hinge;
one or more second sensors configured to determine a geographical position of the apparatus; and
a graphics processing unit to determine content to be displayed on the first display at a viewpoint based on the angle and the geographical position of the apparatus, wherein a three-dimensional display perspective of the content to be displayed on the first display is changed in accordance with a change in the angle between the first portion of the apparatus and the second portion of the apparatus such that the content to be displayed on the first display rotates with a rotation of the first portion of the apparatus about the hinge.

2. The apparatus of claim 1, in which the second portion of the apparatus includes a second display.

3. The apparatus of claim 1, in which the graphics processing unit generates graphical content to be displayed on the first display at a viewpoint based on an angle between the first display and a gravity vector normal to the earth.

4. The apparatus of claim 1, in which the graphics processing unit generates content corresponding to an application view option for the first display based on an angle between the first display and the second portion.

5. The apparatus of claim 1, in which the graphics processing unit generates content corresponding to an application view option for the first display based on an angle between the first display and a magnetic field vector.

6. The apparatus of claim 1, further comprising:
an accelerometer to measure a relative orientation of the first portion relative to a gravity vector or other inertial frame of reference.

7. The apparatus of claim 2, in which the second display is to display a first view for an application, while the first display is to display one of several different views for the application based on the angle between the first and second portions.

8. The apparatus of claim 1, further comprising:
an antenna to couple the apparatus to a wireless network.

9. A method, comprising:
measuring, with a first sensor, an angle between a first portion of an electronic device including a first display and a second portion of the electronic device rotatably coupled to the first portion of the electronic device by a hinge;
determining, with a second sensor, a geographical position of the electronic device; and
determining content to be displayed on the first display at a viewpoint based on the angle and the geographical position of the electronic device, wherein a three-dimensional display perspective of the content to be displayed on the first display is changed in accordance with a change in the angle between the first portion of the electronic device and the second portion of the electronic device such that the content to be displayed on the first display rotates with a rotation of the first portion of the electronic device about the hinge.

10. The method of claim 9, in which the second portion includes a second display.

11. The method of claim 9, further comprising:
generating graphical content to be displayed on the first display at a viewpoint based on an angle between the first display and a gravity vector normal to the earth.

12. The method of claim 9, further comprising:
generating content corresponding to an application view option for the first display based on an angle between the first display and the second portion.

13. The method of claim 9, further comprising:
generating content corresponding to an application view option for the first display based on an angle between the first display and a magnetic field vector.

14. The apparatus of claim 1, in which the one or more first sensors include one or more potentiometers, one or more resolvers, one or more optical encoders, one or more magnetic devices, or one or more capacitive devices.

15. The apparatus of claim 1, further comprising:
a compass to measure a direction of the apparatus with respect to magnetic north, wherein the graphics processing unit controls the viewpoint to correspond with a heading of the apparatus.

16. The apparatus of claim 1, further comprising:
a sensor to sense a movement of the apparatus about at least one of a roll axis, a pitch axis, and a yaw axis, wherein the graphics processing unit adjusts the viewpoint based on the movement.

17. A non-transitory, tangible, computer-readable storage medium, encoded with instructions that, when executed by an electronic device, causes the electronic device to perform a method comprising:
measuring, with a first sensor, an angle between a first portion of the electronic device including a first display and a second portion of the electronic device rotatably coupled to the first portion of the electronic device by a hinge;
determining, with a second sensor, a geographical position of the electronic device; and determining content to be displayed on the first display at a viewpoint based on the angle and the geographical position of the electronic device, wherein a three-dimensional display perspective of the content to be displayed on the first display is changed in accordance with a change in the angle between the first portion of the electronic device and the second portion of the electronic device such that the content to be displayed on the first display rotates with a rotation of the first portion of the electronic device about the hinge.

18. The medium of claim 17, in which the second portion comprises a second display to display a first view for an application, while the first display displays a different view for the application based on the angle between the first and second portions.

19. The medium of claim 17, the method further comprising:
   measuring, with a compass, a direction of the electronic device with respect to magnetic north; and
   controlling the viewpoint to correspond with a heading of the electronic device.

20. The medium of claim 17, the method further comprising:
   sensing, with a sensor, a movement of the electronic device about at least one of a roll axis, a pitch axis, and a yaw axis; and
   adjusting the viewpoint based on the movement.

* * * * *